(12) United States Patent
Latorre

(10) Patent No.: US 9,742,991 B2
(45) Date of Patent: Aug. 22, 2017

(54) 360 DEGREE PHOTOBOOTH KIOSK

(71) Applicant: Robert Frank Latorre, Dallas, TX (US)

(72) Inventor: Robert Frank Latorre, Dallas, TX (US)

( * ) Notice: Subject to any disclaimer, the term of this patent is extended or adjusted under 35 U.S.C. 154(b) by 515 days.

(21) Appl. No.: 14/286,734

(22) Filed: May 23, 2014

(65) Prior Publication Data

US 2014/0347441 A1    Nov. 27, 2014

Related U.S. Application Data

(60) Provisional application No. 61/287,459, filed on May 24, 2013.

(51) Int. Cl.
| | |
|---|---|
| *H04N 5/232* | (2006.01) |
| *H04N 5/225* | (2006.01) |
| *H04N 5/374* | (2011.01) |
| *H04N 5/247* | (2006.01) |
| *H04N 5/262* | (2006.01) |

(52) U.S. Cl.
CPC ..... *H04N 5/23229* (2013.01); *H04N 5/23206* (2013.01); *H04N 5/23238* (2013.01); *H04N 5/247* (2013.01); *H04N 5/2627* (2013.01)

(58) Field of Classification Search
CPC .......... H04N 5/23206; H04N 5/23229; H04N 5/23238; H04N 5/247; H04N 5/2627
See application file for complete search history.

(56) References Cited

U.S. PATENT DOCUMENTS

| | | | |
|---|---|---|---|
| 2,298,476 | A | 10/1942 | Goldsmith |
| 3,225,651 | A | 12/1965 | Clay |
| 3,482,913 | A | 12/1969 | Glenn, Jr. |
| 3,508,920 | A | 4/1970 | Glenn, Jr. |
| 3,518,929 | A | 7/1970 | Glenn, Jr. |

(Continued)

FOREIGN PATENT DOCUMENTS

| | | |
|---|---|---|
| AU | 715590 B2 | 12/1995 |
| CA | 2208556 A1 | 6/1996 |

(Continued)

*Primary Examiner* — Md Haque
(74) *Attorney, Agent, or Firm* — Polsinelli PC; Adam C. Rehm

(57) ABSTRACT

The present invention relates to a kiosk design for an advanced photographic system. More specifically, the present invention relates to a self-contained, automated photobooth kiosk. In embodiments of the invention, the photobooth kiosk is capable of taking a 360 degree panoramic photograph or sequence of photographs of a subject and surrounding background. For instance, a customer of the photobooth kiosk may stand in the center of the photobooth and have his or her picture taken with a plurality of specialized "machine vision" cameras, with the images sent to a central processor such as a computer for processing into a 360 degree panoramic photograph or video clip. After the photo-taking session, the customer may collect prints of the pictures at the kiosk, similar to presently available photobooths. The photobooth kiosk may be fully automated such that no operator is necessary, and all options and features desired by the customer may be self-selected by the customer prior to, during, and after the photo-taking session.

28 Claims, 6 Drawing Sheets

(56) References Cited

U.S. PATENT DOCUMENTS

| | | |
|---|---|---|
| 3,598,355 A | 8/1971 | English |
| 3,682,064 A | 8/1972 | Matsunaga et al. |
| 3,815,979 A | 6/1974 | Collender |
| 4,037,950 A | 7/1977 | Lo et al. |
| 4,062,045 A | 12/1977 | Iwane |
| 4,158,487 A | 6/1979 | Collender |
| 4,239,359 A | 12/1980 | Morioka |
| 4,333,715 A | 6/1982 | Brooks |
| 4,698,682 A | 10/1987 | Astle |
| 5,004,335 A | 4/1991 | Montes |
| 5,013,147 A | 5/1991 | Montes |
| 5,022,727 A | 6/1991 | Smith et al. |
| 5,049,987 A | 9/1991 | Hoppenstein |
| 5,184,732 A | 2/1993 | Ditchburn et al. |
| 5,223,925 A | 6/1993 | Hattori |
| 5,237,353 A | 8/1993 | Montes |
| 5,287,437 A | 2/1994 | Deering |
| 5,359,363 A | 10/1994 | Kuban et al. |
| 5,497,188 A | 3/1996 | Kaye |
| 5,659,323 A | 8/1997 | Taylor |
| 6,154,251 A | 11/2000 | Taylor |
| 6,331,871 B1 | 12/2001 | Taylor |
| 6,933,966 B2 | 8/2005 | Taylor |
| 2002/0171557 A1* | 11/2002 | Wegener .......... G08B 13/19619 340/693.6 |
| 2005/0195216 A1* | 9/2005 | Kramer .................... G06F 3/14 345/619 |
| 2006/0182434 A1* | 8/2006 | Nakao .................... G03B 15/05 396/176 |
| 2009/0060168 A1* | 3/2009 | Corry .................. H04M 1/0293 379/413.04 |
| 2009/0201361 A1* | 8/2009 | Lyon .................. H04N 5/23203 348/36 |
| 2009/0303465 A1* | 12/2009 | Clements .......... G01M 11/0278 356/124 |
| 2010/0008657 A1* | 1/2010 | Gassman ............... G03B 15/00 396/2 |
| 2011/0108207 A1* | 5/2011 | Mainers ............. H05K 7/20745 160/87 |
| 2011/0211819 A1* | 9/2011 | Reno .................... G03B 15/02 396/2 |
| 2013/0172963 A1* | 7/2013 | Moffat ................. A61N 5/0616 607/94 |
| 2013/0188063 A1* | 7/2013 | Cameron ................ H04N 5/272 348/207.1 |

FOREIGN PATENT DOCUMENTS

| | | |
|---|---|---|
| EP | 0605045 A1 | 12/1993 |
| EP | 1296179 A2 | 3/2003 |
| WO | 9214341 A1 | 8/1992 |
| WO | 9619892 A1 | 6/1996 |

* cited by examiner

360 DEGREE PHOTOBOOTH KIOSK

This application claims the benefit of U.S. Provisional Application No. 61/827,459, filed May 24, 2013.

TECHNICAL FIELD OF INVENTION

The present invention relates to a kiosk design for an advanced photographic system. More specifically, the present invention relates to a self-contained, automated photobooth kiosk. In embodiments of the invention, the photobooth kiosk is capable of taking a 360 degree panoramic photograph or sequence of photographs of a subject and surrounding background. For instance, a customer of the photobooth kiosk may stand in the center of the photobooth and have his or her picture taken with a plurality of specialized "machine vision" cameras, with the images sent to a central processor such as a computer for processing into a 360 degree panoramic photograph or video clip. After the photo-taking session, the customer may collect prints of the pictures at the kiosk, similar to presently available photobooths. The photobooth kiosk may be fully automated such that no operator is necessary, and all options and features desired by the customer may be self-selected by the customer prior to, during, and after the photo-taking session.

BACKGROUND OF THE INVENTION

Public photobooths date back to at least 1888. In modern times, a majority of people now have a cell phone with a camera, making photograph capture readily accessible at all times so the proper place of the public photobooth is destined to be in the museum. Conventional photobooths today are inexpensive, and designed to be sturdy as against theft and vandalism, and frequented by many who cannot afford cell phones. It is not readily apparent, therefore, that there is any market for a much more expensive photobooth. However, there has not been a consumer oriented photobooth that can take pictures or provide special effects that cannot be captured on cell phones or commercially available cameras. In particular, until now, there has not been a fully automated photobooth experience available which may take a 360 degree panoramic photograph or sequence of photographs of a consumer.

Computer technology advancements have enabled improvements in photographic special effects technology in recent years. A particularly recent photography advancement designed for the movie industry is known as Big Freeze™ (www.bigfreeze.com) in which multiple specially selected cameras are electronically triggered to capture a photographic sequence that creates multiple views culminating in a 360 degree view of the subject at a single moment in time.

The Big Freeze™ system relies on the combination of several Digital Single Lens Reflex (DSLR) cameras placed on a desired path constructed of interconnected triangular truss sections. The camera optics are controlled by software and electronics connected to a computer that, when initiated by an operator, triggers a simultaneous shutter response in several cameras to provide the special effect of "freezing" the action along the multiple locations of the path. The cameras initially process the image and convey the processed digital image to a computer, where specialized software organizes the images. The result is the appearance of a person and/or action taken by a camera moving through three-dimensional space along the path at a "frozen" moment in time.

Set-up and operation of the Big Freeze™ system requires multiple trained personnel to design, assemble, manage, and operate the system. While use of interconnected DSLR cameras is well suited for the Big Freeze™ system, it has numerous drawbacks that prevent its application to the present invention.

For example, DSLR cameras utilize physical shutters in front of the sensor element of the camera, which eventually wear out after repeated actuations. Over the lifetime of the camera, the shutter will eventually slow down and stop, altering the quality of the special effect and requiring replacement of the shutter mechanism or of the entire camera body. Because DSLR cameras are expensive pieces of equipment, replacement of the shutter mechanism or entire camera body results in significant costs for the camera system operator.

The physical shutter of DSLR cameras also presents inherent limitations to shutter speed. For instance, an entry-level DSLR camera may have a shutter speed of 3 frames per second ("fps"), whereas even a professional grade DSLR camera has a shutter speed of roughly a 10 fps. Because of this, DSLR cameras are well suited for single shot and multi-shot photography, but not where a sequence of photographs is to be used to recreate a special effect in a fluid manner.

DSLR mechanics also present timing challenges due to the variance in every camera. This is a problem where highly accurate, simultaneous triggering of multiple cameras is required or where highly accurate, timed intervals of multiple cameras is required.

Also, DSLR cameras are comprised of a body portion as well as a lens portion, with the lens being interchangeable with the body. While this provides the user with flexibility as to the type of lens to be used with a given DSLR camera body, the use of commercially available camera bodies and lenses result in an overall camera of substantial size and weight. When multiple cameras are to be used in a setup such as the Big Freeze™ system, additional consideration must be given to the additional size and weight due to the plurality of cameras required.

Because of their high value, DSLR cameras are a target of theft. In the professional special effects environment of the Big Freeze™ application, the staff never leaves the equipment unattended in the presence of the general public. Further, due to the complexity of the Big Freeze™ system, it takes multiple highly trained personnel to both set up and operate the system in order to capture the 360 degree panoramic photographs of a subject. Various technicians and staff are required to focus and fine-tune the system each time operation is desired. Thus, the camera system that gave rise to the creation of the Big Freeze™ System is unequipped, and unaffordable for use in a publicly accessible and automated special-effects photobooth, and there remains a need for a multiple camera capture system that can be reliably, affordably, and safely used in an automated public photobooth environment.

The present invention provides for a photobooth kiosk which incorporates a consumer oriented 360 degree camera system to allow an automated 360 degree photobooth experience by the general public. No additional technical or support staff is required for the present invention beyond the initial set up process with all options being selectable by a customer of the 360 degree photobooth kiosk during use. The present invention thus provides a movie industry level special effects experience to the general public and allows for everyone to enjoy creating a 360 degree panoramic image or sequence of images without the need for a professional special effects environment such as that provided by the Big Freeze™ system.

The present invention provides a system capable of creating special effects that utilize a plurality of "machine vision" type industrial cameras on a fixed path in the form of a unique photobooth system. The industrial cameras may be CMOS or CCD sensor based cameras capable of high speed capture of a sequence of photographs, and may utilize an electronic shutter with no moving parts on the camera itself. The industrial camera may have an input/output interface for communication with a computer for storage and processing of capture photographs.

In certain embodiments of the invention, the communications interface may be USB™, Firewire™, or gigabit Ethernet in nature. Other digital communications interfaces are also contemplated within the scope of the present invention. The communications interface allows for the computer to control multiple industrial cameras at the same time, allowing for simultaneous triggering of multiple cameras, or triggering a sequence of timed interval photographs by multiple cameras. Combined with the significantly reduced shutter lag time provided by the electronic shutter as compared to a physical shutter in a DSLR camera, greater coordination and accuracy when triggering multiple cameras simultaneously may be achieved.

Through the use of electronic shutters, the industrial cameras are able to capture images at a greater frame rate than is possible by DSLR cameras, and because an electronic shutter has no moving part, such industrial cameras enjoy an extended usable lifespan over DSLR cameras. An added benefit of the use of industrial cameras is their widely available, robust set of software, which makes programming such cameras simpler and faster.

During use of the multiple camera system, the desired effect is selectable by an object customer who is untrained in the operations of the system. The system is specially designed for safe operation under continuous and unsupervised use by the public.

SUMMARY OF THE INVENTION

The present invention provides a 360 degree photobooth system capable of creating a plurality of special effects, wherein the effect desired may be initiated by a customer who is untrained in the operations of the system. In one embodiment, the 360 degree photobooth system may provide for an automated customer experience whereby the customer may take a 360 degree panoramic photograph or a sequence of photographs. A special effects photo kiosk is provided, having a plurality of wall sections connected to form a generally cylindrical enclosure. The enclosure has an interior surface, an exterior surface, and a top end connecting them. An entrance is provided that passes through the enclosure for access to an interior of the enclosure.

On the interior, a circular camera array is provided, comprising a plurality of equally spaced cameras having lenses directed toward a common focal point within the interior of the enclosure. A central processor is provided, having programmable computing capability and electronic data storage capability, and being connected to the cameras of the camera array.

A countdown device is provided, and is electrically connected to the central processor. The countdown device is visible to a person within the interior of the enclosure. An activation switch is electrically connected to the central processor, and is operable by a customer photo-subject from within the enclosure.

In another embodiment, the camera array further comprises a transaction station electrically connected to the central processor, and operable to process payments for use of the photo kiosk.

The transaction station may be operable to select a method and destination for the electronic delivery of digital data representing the photo sequence produced by the photo kiosk.

In another embodiment, the camera array further comprises a truss system mounted to the interior of the enclosure. A plurality of heat transmissive and tamper resistant camera housings is mounted to the truss system in evenly spaced apart relation. A camera is mounted inside each housing. The walls of the enclosure have a wiring trough along the top. Electrical connectors (wiring) pass from the interior of the housings to the interior of the truss system and on to the wiring trough for connection of the cameras to the central processor.

In another embodiment, a light source is mounted inside at least one of the housings, and directed to the interior of the kiosk. The light source is also electrically connected to the central processor. Electrical connectors pass from the interior of the housings to the interior of the truss system, and to the wiring trough for connection of the light source to the central processor. In another embodiment, at least two light sources are mounted inside the housings. In another embodiment, the source lights are LED type lights.

In another embodiment, the camera array further comprises an exterior display monitor electrically connected to the central processor, and connected to the photo kiosk in an orientation facing the exterior of the enclosure.

In another embodiment, software code residing on the central processor is operable to select an image from the video recordings of each camera representing the same moment in time, process the images, assemble the images into a 360 degree photo-sequence reflecting the sequential positions of the cameras, and save the 360 degree photo-sequence to a non-transitory storage media electrically connected to the central processor.

In another embodiment, the software code is operable to coordinate camera frame selection with a countdown device electrically connected to the central processor. The software code may further be operable to instruct the central processor to provide electrical power to the light sources in relation to the initiation of the countdown device such that the selected images will be made at a time the light sources were illuminated. The software code may further be operable to send or share the data file containing the saved 360 degree photo.

In another embodiment, a substantially continuous image is provided on the interior surface of the wall sections. In another embodiment, a plurality of columns is located on the exterior of the enclosure. The columns may have an accessible interior space. A control column may be located on the exterior of the enclosure with an external access door for access to an interior of the control column, and having the central processor located in the interior of the control column.

In another embodiment, a plurality of translucent canopy sections is mounted above the enclosure. The canopy sections may be made of a polycarbonate sheet material.

In another embodiment, a display monitor is attached to the interior surface of a wall section of the enclosure, and is electrically connected to the central processor. The display monitors are operable to provide a selectable panoramic background image inside the enclosure. The software code is operable to provide a selectable panoramic video background image inside the enclosure.

In another embodiment, the software code residing on the central processor is operable to select an image from the video recordings of each camera representing sequential moments in time taken at predetermined intervals, processing the images, assembling the images into a 360 degree photo-sequence reflecting the sequential positions of the cameras and sequential moments in time, and saving the 360 degree photo-sequence to a non-transitory storage media electrically connected to the central processor.

In another embodiment, the plurality of cameras are machine-vision, industrial cameras. The cameras each have an electronic shutter and a CMOS based sensor capable of global shutter exposure control. The cameras have a communications interface for connection to the central processor. The communications interface is a Gigabit Ethernet interface.

In another embodiment, the communications interface is a USB interface. In another embodiment, the communications interface is a firewire interface. The central processor controls and triggers the plurality of cameras via the communications interface.

In another embodiment, image information captured by the plurality of cameras is sent to the central processor for processing into a 360 degree sequence of photographs. The image capture process is initiated by the consumer-subject to be photographed.

The advantages and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
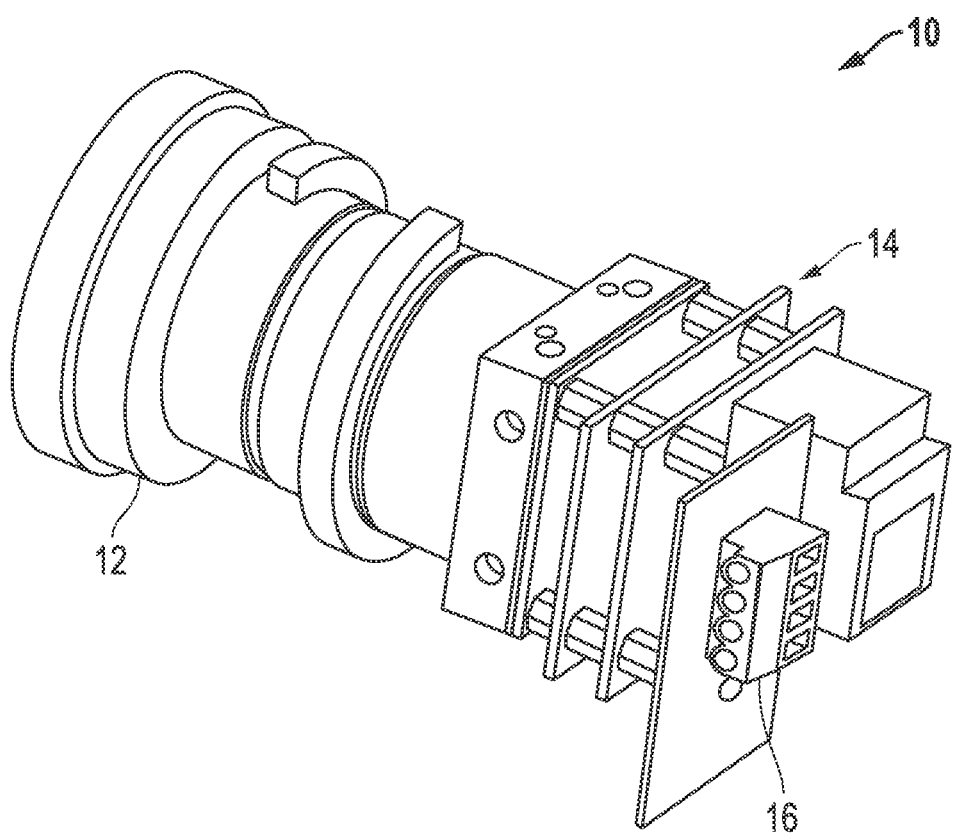
FIG. 1 is an isometric view of the board-level video camera, known as a machine vision camera, as may be used in a camera housing of the present invention.

FIG. 1 is an isometric view of a board-level camera 10. Camera 10 is a video type camera and has no body or related components as would be present in a conventional "machine vision" industrial video camera. Camera 10 has only a lens 12 attached to camera electronic boards 14 via a mount, such as an industry standard C-mount or CS-mount. Camera 10 contains a sensor element, such as a CMOS sensor capable of high speed capture of a sequence of photographs, and may utilize an electronic shutter with no moving parts on the camera itself. In a preferred embodiment of the invention, camera 10 contains a CMOS sensor with global shutter exposure control, wherein all pixels of the sensor are exposed at the same time. This helps to minimize distortion and artifacts when a fast moving object is photographed, such as a person leaping into the air. An electrical connector 16 is provided for supplying power to camera 10 and a communications interface allows for communication with a computer for storage and processing of captured photographs.

In certain embodiments of the invention, electrical connector 16 may be USB™, Firewire™, or gigabit Ethernet in nature. Other digital communications interfaces are also contemplated within the scope of the present invention. The communications interface allows for the computer to control multiple industrial cameras at the same time, allowing for simultaneous triggering of multiple cameras, or triggering a sequence of timed interval photographs by multiple cameras. Combined with the significantly reduced shutter lag time provided by the electronic shutter as compared to a physical shutter in a DSLR camera, greater coordination and accuracy when triggering multiple cameras simultaneously may be achieved.

Figure 2:
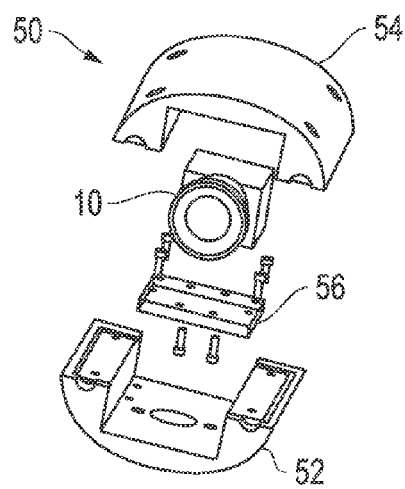
FIG. 2 is an isometric exploded view of a camera housing, as may be incorporated into a camera array of the present invention.

FIG. 2 is an isometric exploded view of a camera housing assembly 50. In the embodiment illustrated, housing assembly 50 is comprised of a first casing 52 and a second casing 54. In the embodiment illustrated, first casing 52 forms a lower half of housing assembly 50 and second casing 54 forms the upper half of housing assembly 50. Camera 10 is mounted securely inside housing assembly 50. In the embodiment shown, camera 10 is mounted to first casing 52 by means of a bracket 56.

Figure 3:
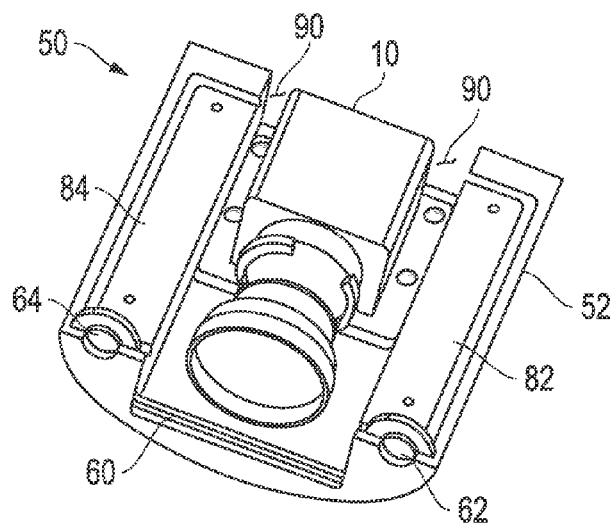
FIG. 3 is an isometric view of the camera housing with the top removed.

FIG. 3 is an isometric view of camera housing assembly 50 with second casing 54 removed. In the embodiment illustrated, a first light source 82 is mounted inside housing assembly 50. A second light source 84 is mounted inside housing assembly 50 on the opposite side of camera 10. First light source 82 and second light source 84 may be LED light sources or other as may be operable to illuminate a subject to be photographed. A lens aperture 60 is formed in housing assembly 50 between first casing 52 and second casing 54.

Figure 4:
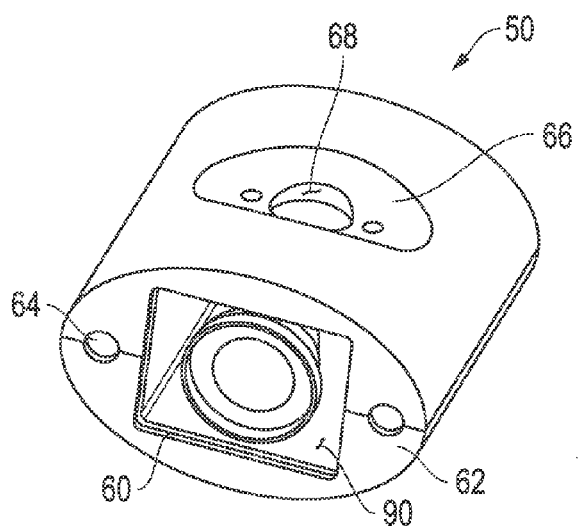
FIG. 4 is an isometric exploded view of an assembled camera housing, made in accordance with an embodiment of the present invention.

FIG. 4 is an isometric exploded view of assembled camera housing assembly 50, made in accordance with an embodiment of the present invention. A first LED light aperture 62 is formed in housing assembly 50 between first casing 52 and second casing 54. A second LED light aperture 64 is formed in housing assembly 50 between first casing 52 and second casing 54 on the opposite side of lens aperture 60. First aperture 62 and second aperture 64 permit light generated by first LED light source 82 and second LED light source 84 to be directed towards a center of circular photo kiosk 1 so as to illuminate the subject to be photographed.

Figure 6:
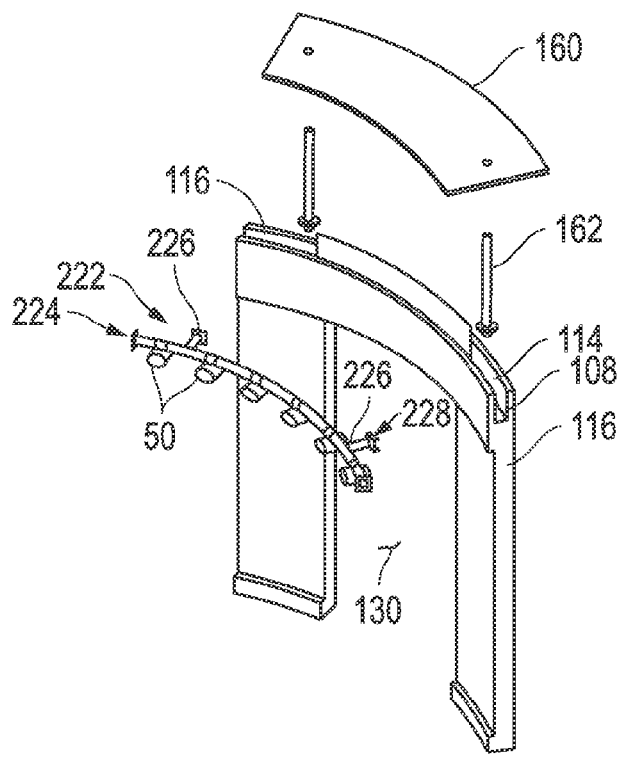
FIG. 6 is an isometric exploded view of a perimeter section of the circular photo kiosk in accordance with embodiments of the present invention.

In the embodiment illustrated, a truss recess 66 is formed on second casing 54 for mounting housing assembly 50 to a camera truss system 250 (FIG. 6). A wiring aperture 68 is located within truss recess 66 to permit electrical wiring to camera 10, first LED 82 and second LED 84 to exit housing assembly 50 and enter camera truss system 220 where it will be protected from access by customers, and where it may be path directed for connection to a central processor 500.

In addition to providing tamper proof protection to camera 10, LEDs 82 and 84, and their respective electrical wiring, housing assembly 50 provides a heat sink 90 for camera 10. In the embodiment illustrated, heat sink 90 is an insulating air space formed between lens aperture 60 and surrounding camera 10 as between first casing 52 and second casing 54. Heat sink 90 may also be a metallic heatsink formed by a finned construction, a fanned construction, a heat pipe construction, or other liquid cooled device or other means known for cooling computer components and the like.

Figure 5:
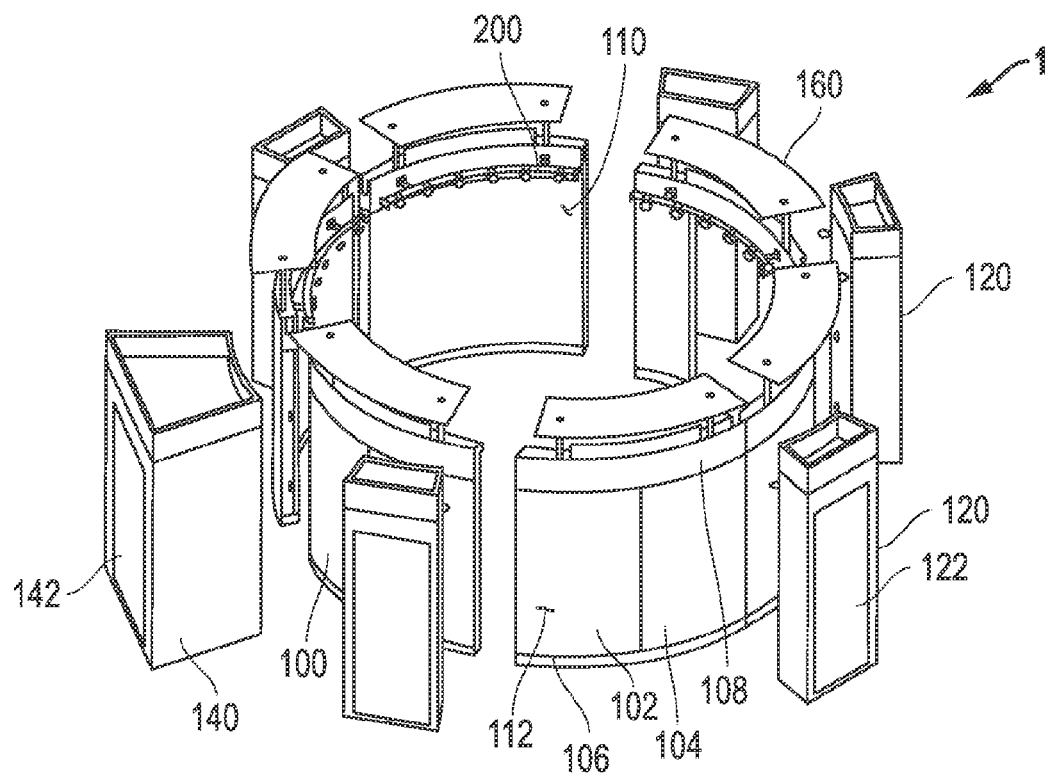
FIG. 5 is an isometric exploded view of a circular photo kiosk in accordance with embodiments of the present invention.

FIG. 5 is an isometric exploded view of circular photo kiosk 1, illustrated in accordance with embodiments of the present invention. As illustrated in FIG. 5, photo kiosk 1 is comprised of a plurality of wall sections 100. In a preferred embodiment illustrated, six (6) connectable wall sections 100 are combined to create an enclosure for circular photo kiosk 1. In this embodiment, each wall section 100 forms a sixty (60) degree circumferential perimeter portion of circular photo kiosk 1. In an alternative embodiment, twelve (12) wall sections 100 are provided, with each wall section forming a thirty (30) degree circumferential perimeter portion of circular photo kiosk 1. A greater or fewer number of wall sections 100 may also be selected as the size of the enclosure may require.

In the embodiment illustrated, each wall section is comprised of a left side panel 102 and a right side panel 104. Left and right panels 102 and 104 are located on a common base section 106. A header portion 108 is connected above and between left and right panels 102 and 104. Base section 106 and header portion 108 may be used to provide stability to the connection of left side panel 102 to right side panel 104.

Wall sections 100 have an interior surface 110 and an exterior surface 112. Displays and promotional materials may be displayed on exterior surface 112 of wall sections 100 (see FIG. 9). Stagnate or selectable scenery that is intended to appear in the background of a 360 degree photo-sequence may be located on interior surface 110 of wall sections 112. For static displays, posters or other background art may be located on interior surface 110 to provide interesting or attractive elements to the photographic sequence being taken.

Figure 7:
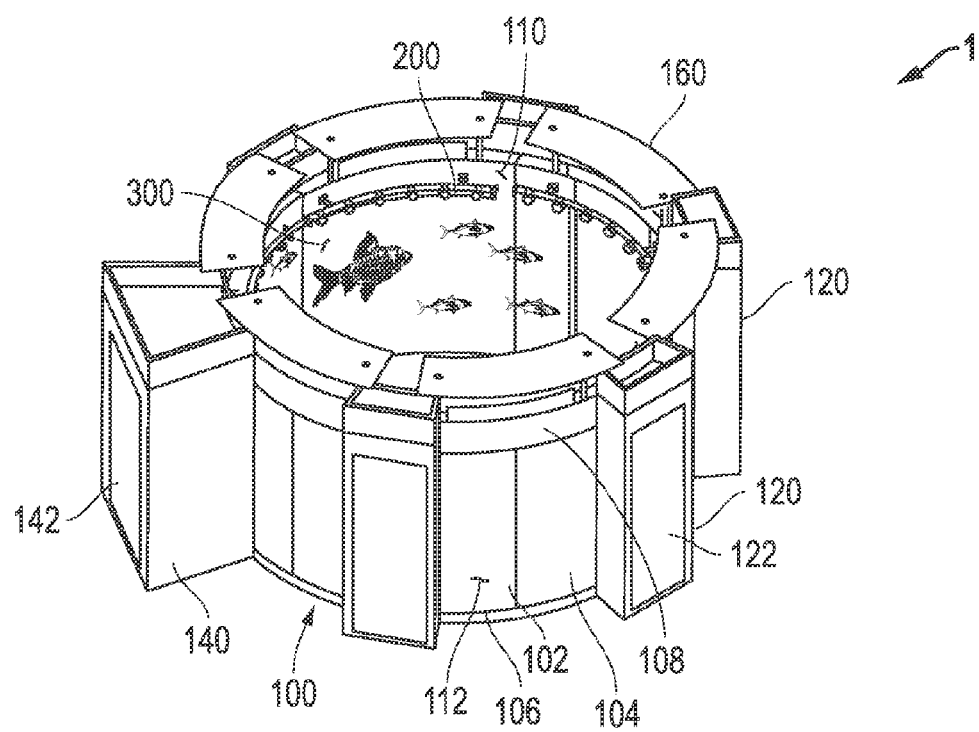
FIG. 7 is an isometric view of the circular photo kiosk in accordance with embodiments of the present invention.

In the embodiment illustrated in FIGS. 6 and 7, rather than a static display, display panel 300 is located against interior surface 112. Display panels 300 may be curved or flexible LED display panels. Each display panel 300 is electrically connected to computer 500, and may display either static or motion based background imagery to enhance the customer experience during the photo session.

In a first embodiment, the customer may select between several panoramic backgrounds for display on display panels 300, such as a desert scene, a battlefield scene, or other scenes from modern times, historical times, or futuristic times. The background on display panels 300 may also be programmed to display an indicator for when the customer should react for the photographs. When the photo sequence begins, the customer (one or more) may jump, pose, or otherwise interact with the background displayed on the collective set of display panels 300.

In a second embodiment, display panels 300 may be coordinated by computer 500 to display a moving background, such as a shark in an undersea setting that swims fluidly between display panels 300. In a related embodiment, cameras 10 can be programmed by computer 500 to trigger sequentially such that movement of the customer in relation to movement in the background is captured together. This may provide a result such as avoiding a shark attack or dodging a bullet. As before, when the photo sequence begins, the customer (one or more) may jump, pose, or otherwise interact with the background displayed on the collective set of display panels 300.

A plurality of columns 120 is located, one each, at the junction of wall sections 100. Thus, six columns 120 are provided for location at the junction of the six wall sections 100. In the embodiment illustrated, one column 120 is an internally accessible control column 140, provided for housing a central processor and data storage unit, such as a computer 500 (not shown) for operation of photo kiosk 1. A power source 600 comprises electrical power and power controls, a breaker/fuse system and surge controls. Such switches, fuse panels and surge protection devices are commonly known and may be variously assembled to the preference of the user. Power source 600 may also be provided inside control column 140.

A control column door 142 provides access to the interior. Control column 140 may be larger than the remaining columns 120. Columns 120 may also be accessible for the storage of maintenance supplies and repair parts. A door 122 may be provided for interior access to column 120, preferably on the side of column 120 opposite to wall section 100. A camera array 200 is located inside photo kiosk 1, and may be mounted to the interior side of header 108.

An optional canopy 160 may be mounted above each wall panel 100. Canopy 160 provides an improved aesthetic appearance to photo kiosk 1. Canopy 160 may be used advantageously to protect camera array 200 from debris and intruders. Canopy 160 may also be used to provide shading to persons inside photo kiosk 1 as well as camera array 200, which reduces lens flare caused by exposure of the lens 12 of camera 10 to direct sunlight when kiosk 1 is installed in an outdoor location.

Canopy 160 may also be used to provide lighting control to the interior of photo kiosk 1. In the embodiment illustrated, canopy 160 is made of a polycarbonate material or other suitable material. Canopy 160 is supported above header 108 by canopy bars 162 or similar means of attachment.

FIG. 6 is an isometric exploded view of a perimeter wall section 100 of circular photo kiosk 1 in accordance with embodiments of the present invention. At least one wall section 100 has an entrance 130 provided to permit customers to enter into the interior of photo kiosk 1 for the purpose of becoming the object of the 360 degree photo sequence. Entrance 130 may optionally have a closable door for providing an uninterrupted background for the 360 photo sequence.

In the preferred embodiment illustrated, header 108 includes a wiring trough 114. Camera array 200 (see FIGS. 7 and 8) comprises a camera truss system 220 which is comprised of multiple truss sections 222. In the embodiment shown, truss sections 222 are hollow tubulars which span a 60 degree arc across the interior of photo kiosk 1. In this configuration, there is allotted a truss section 222 for each wall section 100. Also in this embodiment, each truss section supports six housing assemblies 50 in evenly spaced arrangement. Thus, in a fully configured kiosk 1, thirty-six (36) cameras 10 and housing assemblies 50 may be utilized to capture a 360 degree photo sequence.

An interior space 224 through truss sections 222 receives wiring from camera housing assemblies 50. Each truss section 222 has one or more hollow brackets 226 attached for mounting truss section 222 to header 108 (or optionally to wall section 100). Truss interior space 224 is interconnected to a bracket interior space 228 to permit passage of the wiring from camera housings 50 through bracket interior 228.

Header section 108 has a header portal 116 at the location of connection to bracket 226 of truss section 222. Portal 116 substantially aligns with bracket interior 228 to provide a passage between the interior of truss section 222 and truss bracket 226, and into wiring trough 114 of header 108. In this manner, the collective wiring from all housing assemblies 50 mounted on truss system 220 may be gathered into the larger space of wiring trough 114 and carried to control column 140 for connection to computer 500 and power source 600 provided in control column 140. This provides a tamper proof location for the wiring that is out of view of the public, providing protection to both the public and photo kiosk 1.

It is preferred that wall sections 100 have an effective height between at least 84 inches and less than 120 inches.

It will be appreciated that given the disclosure of the invention as a whole, there are alternative configurations that may be used to construct circular photo kiosk 1 in a manner that is readily manufactured, transported, and assembled, and that is stable when assembled. The present disclosure is one preferred embodiment that satisfies these constraints.

FIG. 7 is an isometric view of photo kiosk 1, illustrated fully assembled. In another alternative embodiment, a green screen display may be located on the interior surface 110. As seen in FIG. 7, fully assembled photo kiosk 1 forms a circular enclosure. Camera array 200 forms a circle mounted to the interior surfaces of headers 108, or the wall sections 100. In an alternative embodiment, camera array 200 may be connected to an elevated structure above photo kiosk 1, such as from a ceiling structure independent of wall section 100. Camera housing assemblies 50 are located at equally spaced apart positions on camera truss system 220. In a preferred embodiment, at least 36 cameras 10 are provided. The wiring from housing assembly 50 passes through aperture 68 of housing assembly 50, through bracket interior space 228, through header portal 116, into wiring trough 114, and to control column 140. Inside control column 140, wiring for cameras 10 and light sources 82 and 84 are electrically connected to central processor 500 and power source 600.

Using control column 140 for reference, wiring from one-half of housing assemblies 50 is collected in wiring trough 114 to the right of control column 140. Wiring from the other one-half of housing assemblies 50 is collected in wiring trough 114 to the left of control column 140.

In this view, a display panel 300 is located and illuminated on the interior surface 110. Display panel may advantageous be a flexible LED display panel. In this embodiment, display panel 300 is also electrically connected to central processor 500. In an alternative embodiment, a static display can be located on the interior surface 110.

Figure 8:
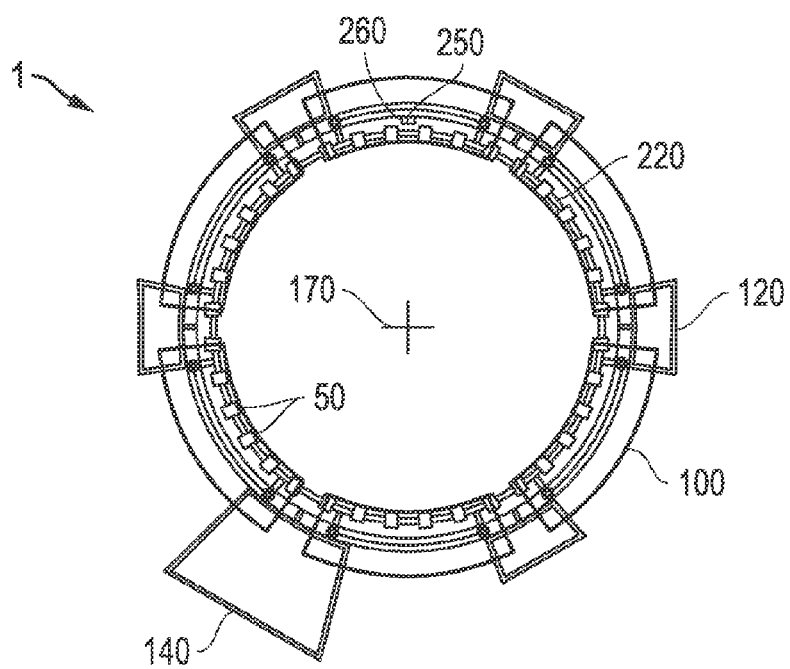
FIG. 8 is a top view of the circular photo kiosk in accordance with embodiments of the present invention.

FIG. 8 is a top view of photo kiosk 1 in accordance with embodiments of the present invention. As seen in FIG. 8, there is a common focal point 170 to which all cameras 10 are directed. An indicator may be marked on the floor for customers of photo kiosk 1 to know where to stand or otherwise position themselves prior to the commencement of the 360 degree photo sequence.

In the embodiment illustrated, an optional start button 250 is provided as being accessible from the interior of photo kiosk 1. Also in the embodiment illustrated, a countdown device 260 is located so as to be visible to a consumer of photo kiosk 1. In the embodiment in which a display panel 300 is provided, the countdown device 260 function may be advantageously incorporated into the graphic display of display device 300.

Figure 9:
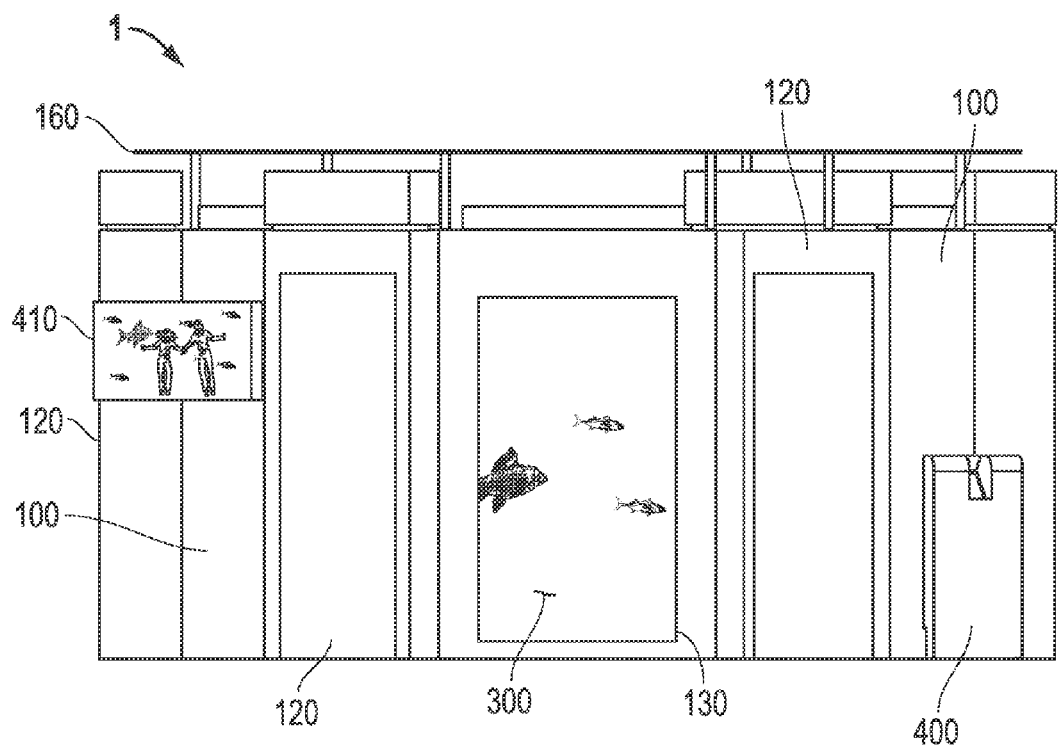
FIG. 9 is a side view of the circular photo kiosk in accordance with embodiments of the present invention.

FIG. 9 is a side view of photo kiosk 1 in accordance with embodiments of the present invention. FIG. 9 illustrates how kiosk 1 is formed through various wall sections 100 and columns 120. In embodiments of the invention, the exterior surfaces of wall sections 100 may be used to display advertising or other attractive graphics or imagery to attract prospective customers to kiosk 1. An entrance 130 is provided for a customer to enter photobooth kiosk 1 on a wall section 100, between two adjacent columns 120. Through entrance 130, the background (discussed above) on display panels 300 is visible. An optional transaction station 400 is provided for customers wanting to use photobooth kiosk 1. Transaction station 400 is electrically connected to central processor 500 for processing advance payment for use of photobooth kiosk 1.

The customer may also utilize transaction station 400 to provide a preferred delivery means for delivery of the digital photo sequence taken by photo kiosk 1, such as by email, cell phone, social network delivery, printed photographs, or other. If printed photographs are desired, the customer may collect such photographs at transaction station 400 after utilizing kiosk 1 for the photo sequence. Also in this embodiment, the customer can potentially select a background environment for display during the photo sequence on display panels 300.

Figure 10:
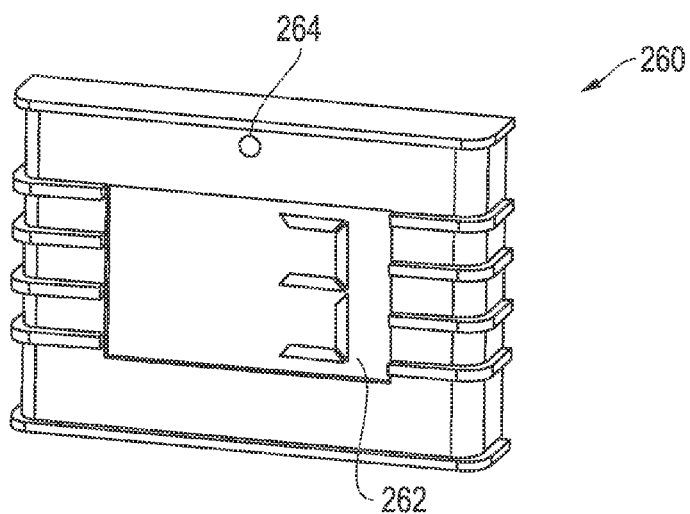
FIG. 10 is an isometric view of a countdown indicator as would be located within the field of view of an occupant of the circular photo kiosk, in accordance with embodiments of the present invention.

FIG. 10 is an isometric view of countdown device 260 as would be located within the field of view of an occupant of photo kiosk 1, in accordance with embodiments of the present invention. In this embodiment, a counter 262 may be provided to indicate the time, such as seconds before which the customer should jump or otherwise strike a pose. Additionally, or in lieu of counter 262, countdown device 260 may provide a light indicator 264 to provide a light sequence that communicates to the customer that they should prepare for the pictures to be taken.

Figure 11:
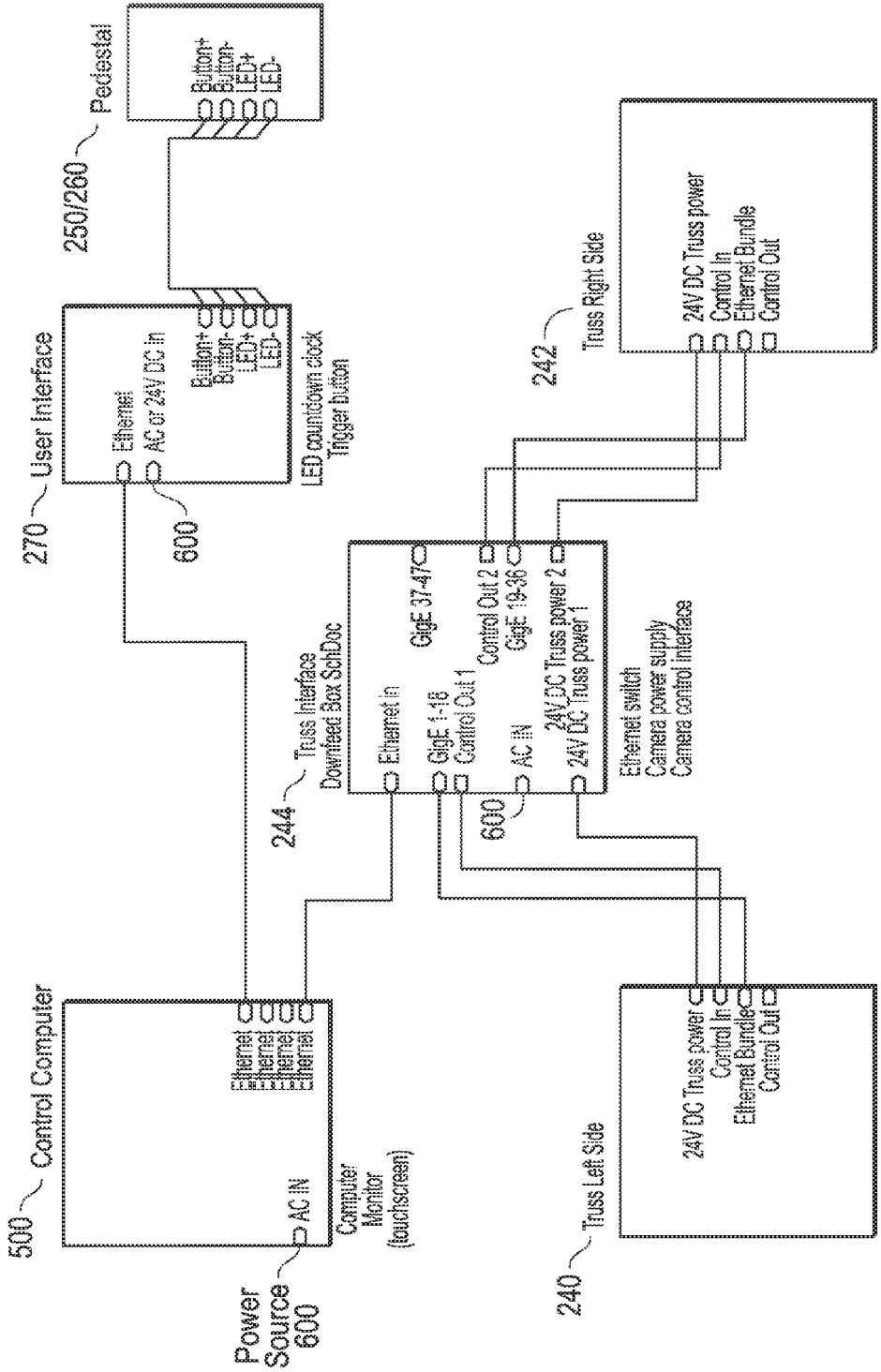
FIG. 11 is a schematic of an embodiment of electrical connections in a manner according to an embodiment of the present invention.

FIG. 11 is a schematic of an embodiment of certain electrical connections, illustrated in a manner in accordance with a basic embodiment of the present invention. As stated above, wiring from one-half of housing assemblies 50 is collected in wiring trough 114 to the right of control column 140, forming truss left side wiring 240. Wiring from the other one-half of housing assemblies 50 is collected in wiring trough 114 to the left of control column 140, forming truss right side wiring 242. A truss interface 244 provides an electrical manifold for truss left side wiring 240 and truss right side wiring 242.

In the embodiment illustrated, electrical connections between central processor 500 and cameras 10 and light sources 82 and 84 may include USB™, Firewire™, and Gigabit Ethernet bundle connections, Control In and Control Out connections, and 24V DC Truss Power supply. Truss interface 244 may include a transformer for providing DC power from power source 600.

Truss interface 244 is electrically connected to central processor 500 and power supply 600. In the embodiment shown, this is accomplished by an Ethernet connection. It is understood by persons of skill in the art that power supply 600 is not expected to be a single connection but rather several connections of supplied power and is only referred to herein in the singular for convenience.

Countdown device 260 and start button 250 are connected to Control Computer 500 through a User Interface 270.

Not illustrated here, further connections are provided for the optional internal displays 300, external display 410, and transaction station 400.

Operation

Referring back to FIGS. 7 and 9, a customer of kiosk 1 may approach transaction station 400 to begin a transaction with kiosk 1. The customer may select the type of photo-sequence he or she wishes to be taken, such as a single "freeze-frame" shot at a specific point in time, or a multi-shot sequence where the customer may have a short action sequence taken. The customer may optionally select a desired background to be displayed on interior display panels 300 for embodiments of the invention which utilize electronic display panels 300. For kiosks 1 where interior display panels 300 are static, this option is not provided to the customer. Next, the customer may also utilize transaction station 400 to select a preferred delivery method for delivery of the digital photo sequence taken by photo kiosk 1, such as by email, cell phone, social network delivery, printed photographs, or other. If printed photographs are desired, the customer may collect such photographs at transaction station 400 after utilizing kiosk 1 for the photo sequence. After selecting the desired options, the customer or customers may be directed to step inside kiosk 1 via entrance 130.

If provided, customers may close a door to entrance 130 to complete the seamless nature of the background provided by interior display panels 300. The customers are then directed to place themselves in the center of kiosk 1 such that all cameras 10 mounted on camera truss system 220 may achieve proper focus of the customers. The focus of cameras 10 may be pre-calibrated to be focused at the center of kiosk 1. Cameras 10 are pre-aligned to a common focal point 170, which is centered in camera array 200, and above the ground level at a predetermined height. To assist with centering customers within kiosk 1 near to focal point 170, a mark such as a cross or "X" may be located in the center of kiosk 1.

When prepared, the customer may initiate the countdown to the photographs by activating a switch 250. Switch 250 is electrically connected to, and initiates, a countdown which is displayed on a countdown device 260 that is viewable from the interior of kiosk 1. Countdown device 260 may display a numerical countdown sequence through counter 262 or by one or more light indicators 264, or both.

When the countdown is complete, the customer may strike a pose for a "freeze-frame" shot, or if previously selected, the customer may act out a desired action sequence. Central processor 500 is electrically connected to switch 250 and to counter 262. First and second light sources 82, 84 located in camera pod assemblies 50 are provided electrical power to illuminate the customer-subject in advance of shutter operation of cameras 10. Cameras 10 in camera array 200 are then initiated and triggered upon expiration of the countdown, or upon a short delay thereafter so as to capture the desired moment of the customer's movement. Cameras 10 within camera array 200 may be simultaneously and/or sequentially triggered depending upon the options previously selected by the customer. Central processor 500 controls the triggering of all cameras 10 through the multitude of communications interfaces at electrical connectors 16. In this fashion, kiosk 1 takes and creates a 360 degree panoramic photograph or sequence of photographs of the customer at a specific moment in time, or over a brief duration of time.

After the photo sequence is complete, customers may exit kiosk 1 by opening the door, if provided, or merely passing through entrance 130. Central processor 500 transmits the final 360 degree photo sequence by way of the previously selected delivery method. If physical photos are desired, they may be printed by the kiosk 1, and collected by the customer at this time. The kiosk 1 is then ready for a new customer and photo sequence.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A special effects photo kiosk comprising:
   a plurality of wall sections connected to form a generally cylindrical enclosure having an interior surface and an exterior surface, each of the plurality of wall sections forming a portion of the interior surface and a portion of the exterior surface;
   an entrance passing through the cylindrical enclosure to provide access to an interior of the cylindrical enclosure;
   a plurality of cameras secured along the plurality of wall sections to form a circular camera array, each of the plurality of cameras including a lens directed toward a common focal point within the interior of the cylindrical enclosure, the circular camera array capable of capturing a 360 degree panoramic view of a subject at the common focal point;
   a central processor (i) having programmable computing capability and electronic data storage capability, and (ii) electrically connected to each of the plurality of cameras;
   a countdown device (i) electrically connected to the central processor, (ii) visible from within the interior of the cylindrical enclosure, and (iii) operable to be initiated by an activation switch electrically connected to the central processor;

at least one light source operable to illuminate when the circular camera array is capturing the 360 degree panoramic view of the subject at the common focal point;

a display monitor (i) attached to the interior surface of each of the plurality of wall sections, and (ii) electrically connected to the central processor, the display monitors operable to display a substantially continuous image;

a truss system secured to the cylindrical enclosure;

a plurality of housings mounted to the truss system, each of the plurality of cameras mounted within a respective one of the plurality of housings; and software code residing on the central processor, the software code operable to (i) cause the at least one light source to illuminate in relation to initiation of the countdown device, (ii) select an image from each of the plurality of cameras representing a same moment in time, and (iii) assemble the images into a 360 degree photograph sequence reflecting a sequential position of each of the plurality of cameras.

2. The special effects photo kiosk of claim 1,
wherein,
the circular camera array includes a transaction station (i) electrically connected to the central processor, and (ii) operable to process payments for use of the photo kiosk.

3. The special effects photo kiosk of claim 2,
wherein,
the transaction station is operable to select a method and destination for an electronic delivery of digital data representing the photo sequence produced by the photo kiosk.

4. The special effects photo kiosk of claim 1,
wherein, the at least one light source is a plurality of light sources,
each of the light sources being mounted inside one of the housings, and
each of the light sources being (i) directed to the interior of the kiosk, and (ii) electrically connected to the central processor.

5. The special effects photo kiosk of claim 4,
wherein, the circular camera array includes electrical connectors passing from the interior of the housings and to the wiring trough for connection of the plurality of light sources to the central processor.

6. The special effects photo kiosk of claim 1,
wherein,
the circular camera array includes an exterior display monitor (i) electrically connected to the central processor, and (ii) connected to the photo kiosk in an orientation facing the exterior of the cylindrical enclosure.

7. The special effects photo kiosk of claim 1,
wherein, the at least one light source is a plurality of light sources, and
each of the housings includes at least two of the plurality of light sources.

8. The special effects photo kiosk of claim 7,
wherein, each of the plurality of light sources are LED type lights.

9. The special effects photo kiosk of claim 1,
wherein, the software code is operable to save the 360 degree photo-sequence to a non-transitory storage media electrically connected to the central processor.

10. The special effects photo kiosk of claim 1,
wherein, the software code is operable to coordinate camera frame selection with the countdown device.

11. The special effects photo kiosk of claim 1:
wherein, the software code is operable to send or share the data file containing the saved 360 degree photograph.

12. A special effects photo kiosk comprising:
a plurality of wall sections connected to form a generally cylindrical enclosure having an interior surface and an exterior surface, each of the plurality of wall sections forming a portion of the interior surface and a portion of the exterior surface;

an entrance passing through the cylindrical enclosure to provide access to an interior of the cylindrical enclosure;

a plurality of cameras secured along the plurality of wall sections to form a circular camera array, each of the plurality of cameras including a lens directed toward a common focal point within the interior of the cylindrical enclosure, the circular camera array capable of capturing a 360 degree panoramic view of a subject at the common focal point;

a central processor (i) having programmable computing capability and electronic data storage capability, and (ii) electrically connected to each of the plurality of cameras;

a countdown device (i) electrically connected to the central processor, (ii) visible from within the interior of the cylindrical enclosure, and (iii) operable to be initiated by an activation switch electrically connected to the central processor;

at least one light source operable to illuminate when the circular camera array is capturing the 360 degree panoramic view of the subject at the common focal point;

a truss system secured to the cylindrical enclosure;

a plurality of housings mounted to the truss system, each of the plurality of cameras mounted within a respective one of the plurality of housings; and software code residing on the central processor, the software code operable to (i) cause the at least one light source to illuminate in relation to initiation of the countdown device, (ii) select an image from each of the plurality of cameras representing a same moment in time, and (iii) assemble the images into a 360 degree photograph sequence reflecting a sequential position of each of the plurality of cameras,
wherein,
the interior surface of the plurality of wall sections is operable to provide a substantially continuous image.

13. The special effects photo kiosk of claim 1, further comprising:
a plurality of columns located on the exterior of the cylindrical enclosure.

14. The photo kiosk of claim 13,
wherein,
the columns having an accessible interior space.

15. The special effects photo kiosk of claim 1, further comprising:
a control column located on the exterior of the cylindrical enclosure; and
an external access door for access to an interior of the control column, the central processor located in the interior of the control column.

16. The photo kiosk of claim 1, further comprising:
a plurality of translucent canopy sections mounted above the cylindrical enclosure.

17. The photo kiosk of claim 16,
wherein,
the canopy sections includes a polycarbonate sheet material.
18. The special effects photo kiosk of claim 1,
wherein,
the image is a selectable panoramic background image.
19. The special effects photo kiosk of claim 12,
wherein, the software code is operable to cause the 360 degree photo-sequence to be saved to a non-transitory storage media electrically connected to the central processor.
20. The special effects photo kiosk of claim 1,
wherein, the plurality of cameras are machine-vision, industrial cameras.
21. The special effects photo kiosk of claim 1,
wherein,
each of the plurality of cameras have an electronic shutter and a CMOS based sensor capable of global shutter exposure control.
22. The special effects photo kiosk of claim 1,
wherein,
each of the plurality of cameras have a communications interface for connection to the central processor.
23. The special effects photo kiosk of claim 22,
wherein,
the communications interface is a Gigabit Ethernet interface.
24. The special effects photo kiosk of claim 22,
wherein,
the communications interface is a USB interface.
25. The special effects photo kiosk of claim 22,
wherein,
the communications interface is a firewire interface.
26. The special effects photo kiosk of claim 22,
wherein,
the central processor is operable to control the plurality of cameras via the communications interface.
27. The special effects photo kiosk of claim 22,
wherein, the central processor is operable to receive image information captured by the plurality of cameras for processing into the 360 degree photograph sequence.
28. The special effects photo kiosk of claim 1,
wherein, the countdown device is operable to be initiated by the subject from within the cylindrical enclosure.

\* \* \* \* \*